Sept. 22, 1970      T. P. WHITE, SR      3,529,825
HOCKEY STICK ROAD ADAPTER
Filed May 22, 1967      3 Sheets-Sheet 1
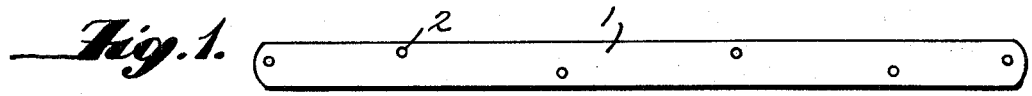
  
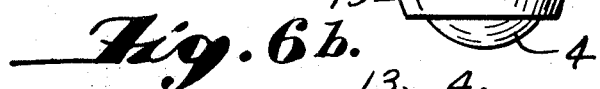  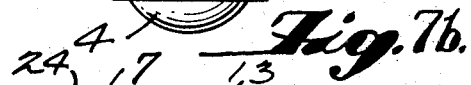
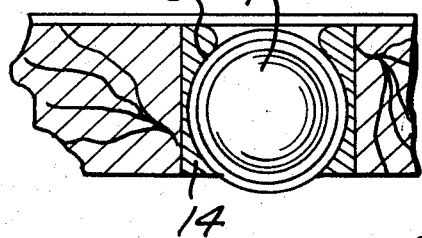  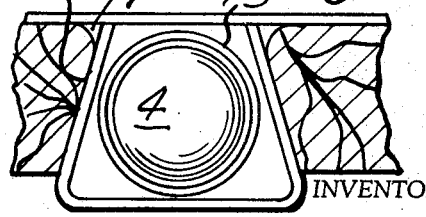
INVENTOR
THOMAS PAUL WHITE, SR.
BY Cushman, Darby & Cushman
ATTORNEYS Sept. 22, 1970   T. P. WHITE, SR   3,529,825
HOCKEY STICK ROAD ADAPTER
Filed May 22, 1967   3 Sheets-Sheet 2
Fig. 8.
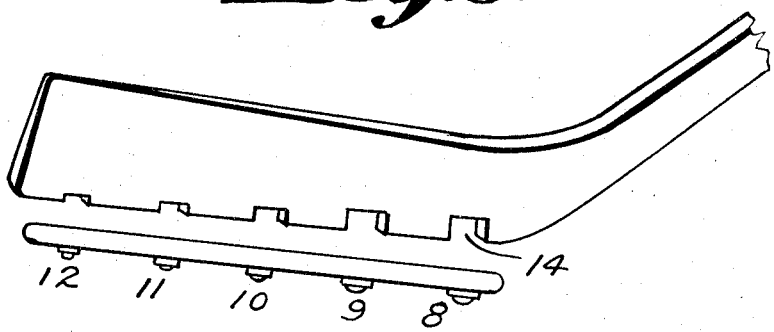
Fig. 9.
Fig. 10.
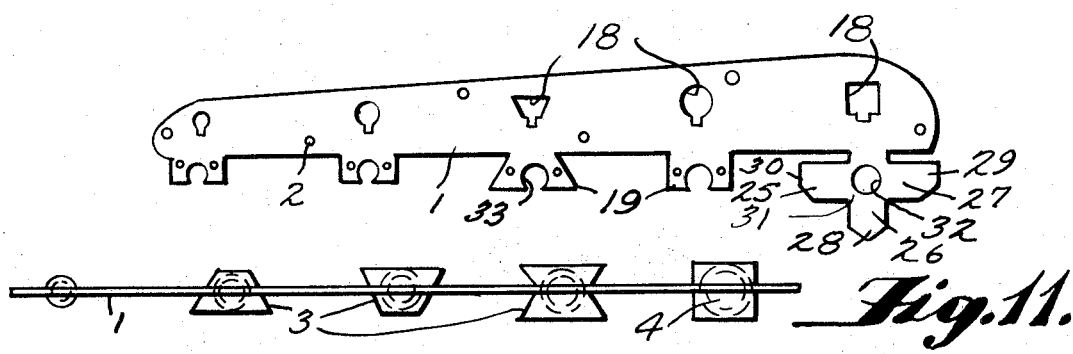
Fig. 11.
Fig. 12.
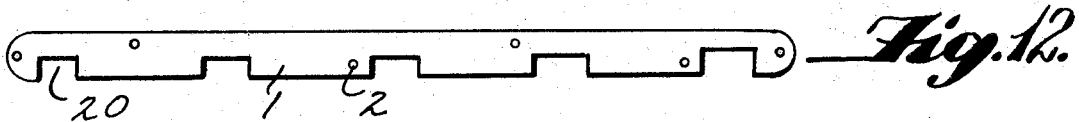
Fig. 13a.
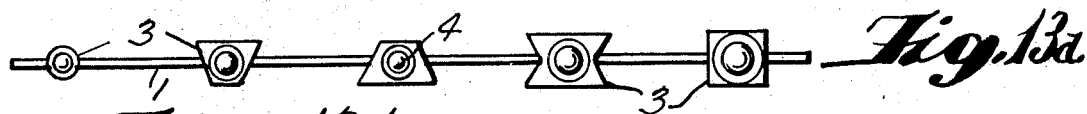
Fig. 13b.
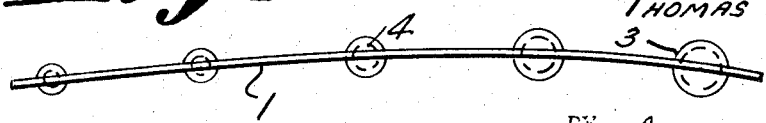
INVENTOR
THOMAS PAUL WHITE, SR.
BY Cushman Darby & Cushman
ATTORNEYS Sept. 22, 1970    T. P. WHITE, SR    3,529,825
HOCKEY STICK ROAD ADAPTER
Filed May 22, 1967    3 Sheets-Sheet 3

INVENTOR
THOMAS PAUL WHITE, SR.

BY Cushman, Darby & Cushman
ATTORNEYS

United States Patent Office 3,529,825
Patented Sept. 22, 1970

3,529,825
HOCKEY STICK ROAD ADAPTER
Thomas Paul White, Sr., 109 Gilbert St.,
Saint John, New Brunswick, Canada
Filed May 22, 1967, Ser. No. 641,748
Int. Cl. A63b 59/00
U.S. Cl. 273—67                    7 Claims

ABSTRACT OF THE DISCLOSURE

A friction reducing means for a hockey stick blade is described in which a number of balls are placed in a spaced relationship along the lower edge of the hockey stick blade by means of retainers which hold said balls in an attached relationship to a blade-like attachment member. The attachment member is fixedly attached to one of the faces of the hockey stick blade. The retainers allow the balls to rotate, and the balls extend below the blade sufficiently that they are caused to rotate when they come into contact with an adjacent surface.

---

This invention relates to hockey sticks used in playing the game of ice-hockey and amongst the objectives of the invention are to provide a hockey stick having a number of balls mounted in a fabrication attached to the shooting face and inserted into notches in the bottom edge of a hockey stick blade, which balls are arranged so as to protrude exteriorily and to revolve below the bottom of the blade of the hockey stick so that a player or user can use the hockey stick to shove, dribble, throw or lift a hockey puck or other suitable object on paved, wooden, cement or on any other usable surface.

Further objectives are to provide means to arrange a number of balls in spaced apart alignment, inserted into notches prepared, in corresponding relation to the ball retainers, in the bottom edge of the stick blade, in such a manner as to allow the balls to revolve and as to allow the hockey stick to be used by all users with greater speed, mobility, and avoidance of friction when using the hockey stick to shove, dribble, throw or lift a puck or any other suitable object on ground surfaces and other surfaces as aforesaid and with less breakage and damage to sticks.

Further objectives are to provide a further use for hockey sticks the blades of which have become worn, scuffed, chipped or damaged through previous use.

Further objectives are to provide an improvement to the hockey stick which can, by use in combination with my invention, be used as an aid in the training of hockey players in all seasons of the year and by others interested in the game of ice-hockey or variations thereof and otherwise and for all players and users for use for exercising, diversion amusement and relaxation purposes and further used to aid the user in the development of quick mental and muscular reactions and improved dexterity and co-ordination in muscular control when playing the game of ice-hockey and any variation thereof and otherwise generally when using my invention in combination with a hockey stick.

The subject of this patent application is an improved version of my previous U.S. patent application No. 381,315 dated July 9, 1964, now U.S. Pat. No. 3,377,065 issued April 9, 1968. The improvement lies firstly in the realm of weight and bulk, with the elastic sleeve on the above dated application being replaced with a less cumbersome single blade, and secondly the full length ball retaining portion of the same to be replaced by individual ball retaining chambers of varying designs, and thirdly the removal of the shearing-off prone ball retainer of the said previous device by inserting the ball retaining chambers or compartments up into notched out parts of the bottom of the hockey stick blade, thus leaving a minimal projection below the bottom edge of the hockey stick blade, in the form of revolvable balls which would minimize any sudden grabbing effect when brought up suddenly.

In the drawings which illustrate the embodiment of the invention in which the same characters are used for the same parts in the several different views:

FIG. 1 is a side elevation of a first embodiment of the blade-like attachment member constructed according to the principles of this invention.

FIG. 2 is an illustration of the varying sizes and designs of the ball retaining chambers.

FIG. 3 is a top veiw of the first embodiment of the blade-like attachment member showing the top edge of the blade and the tops of the ball retainers and a means of attaching or fastening them to the blade.

FIG. 4 is a side elevation of the first embodiment of the blade-like attachment member of the invention showing the ball retaining chambers in place and fastened to the blade.

FIG. 5 is a bottom view of the first embodiment of the blade-like attachment member constructed according to the principles of this invention showing the balls protruding from the chambers and the reduced or fashioned retainers holding them in and a means for them to be attached to the blade the bottom edge of which is also showing.

Figure 14A:
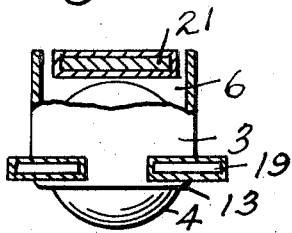

FIG. 6a is an expanded view of the side of ball retaining chamber showing how the side walls and top act as the frictional members for the non-frictional member, with a cutaway portion disclosing a space in which dirt and water may collect; it also shows a hole in the chamber wall through which this dirt may be washed away. This hole of course can be located in any suitable location and may take any form.

FIG. 6b is a bottom elevation showing the bottom edge of the ball retaining chamber shown in FIG. 6a in place on the lower portion of the hockey stick blade with the blade-like attachment member fixed to the face of the blade.

FIG. 7a is a pictorial view of an alternate embodiment which may be employed for the retaining chambers, in this case a V shape is employed and the ball is seen as it is retained by the ball retainer and frictionally retained and protected by the walls of the chamber.

FIG. 7b illustrates the bottom view of the walls of the retaining chamber are V angled to exactly conform to the V angle notched in the bottom of the hockey stick blade and this prevents the chambers from being pulled through the notches by the force of drag, and since the chamber is attached to the invention blade which straddles the notch, it cannot be forced out the back either.

FIG. 8 is a sketch of the blade of an ice-hockey stick with a portion of the handle showing and also the notched out portions of the hockey stick blade are shown and with the invention completely assembled and in position to be fitted into the notches and onto the shooting face of the blade of a right hand stick. Naturally it follows that for a left hand stick, the chambers will have to be attached to the reverse side of the invention blade.

FIG. 9 is a bottom view of the blade of a hockey stick showing that different manufacturers make different thicknesses and tapers to their respective hockey sticks and the ball protruding through the back shows that it could conceivably protrude to a greater extent or recede into the blade depending on the thickness of the blade.

FIG. 10 is a side elevation of a second embodiment of the blade-like attachment member constructed according to the principles of this invention showing where portions of or shapes were struck out across the top part of the invention blade, to be bent backwards at 90 degrees to form the cap of the chambers by slipping just inside the walls of the chamber thus gripping the chamber in such a manner as to prevent it being torn away from the blade, a means of securing it in position being provided by welding or other methods. Claw like flaps are cut at the bottom of the invention blade and likewise bent back at an angle of 90 degrees to grasp the ball retainer and holding it fast so that it neither may be torn away from the attachment member after means have been taken to secure them in place.

FIG. 11 is a top view of a third embodiment of a blade-like attachment member constructed according to the principles of the invention showing it centred over the ball retaining chambers which are recessed into it and fastened in place by a permanent means, such as welding, tongue and groove, clipping, flaps with rivets or other.

FIG. 12 is a side elevation of the attachment member shown in FIG. 10 with graduated sized notches cut from, to receive the graduated sized chambers.

FIG. 13a is a bottom view of the FIG. 11 embodiment showing the chambers in place and the balls protruding exteriorily therefrom and a variation in the shape of the chamber which should be made to taper slightly forward to conform to the forward taper of the stick blade.

FIG. 14a is an expanded view of the ball retaining chamber with the struck-out cap seated in position over and touching the non-friction member and the claw like appendages in place around the ball retaining portion of the chamber.

Figure 14B:
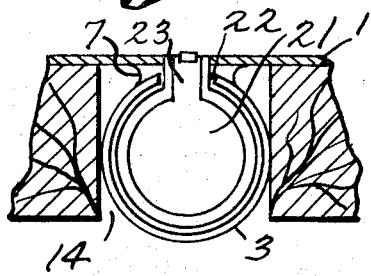

FIG. 14b is a bottom view of a portion of the hockey stick blade showing the ball retaining member shown in FIG. 14a in place in a recess in the blade.

Figure 15A:
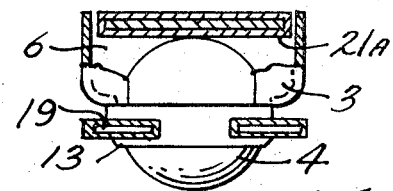

FIG. 15a illustrates the second embodiment of the ball retaining member shown in FIG. 14 in an irregular shape, in this case the V-cut.

Figure 15B:
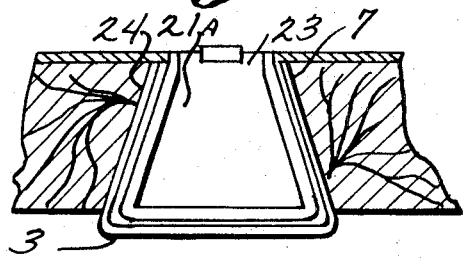

FIG. 15b is a bottom view of a portion of the hockey stick blade with the retaining member shown in FIG. 15 inserted therein.

Figure 16:
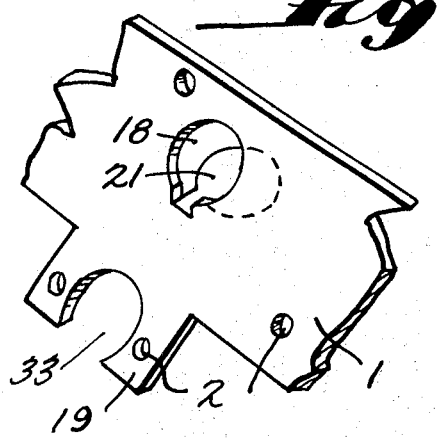

FIG. 16 is an enlarged view of a portion of the embodiment of the blade-like attachment member shown in FIG. 10 showing the struck-out hole and the pattern cut appendage at the bottom.

Figure 17:
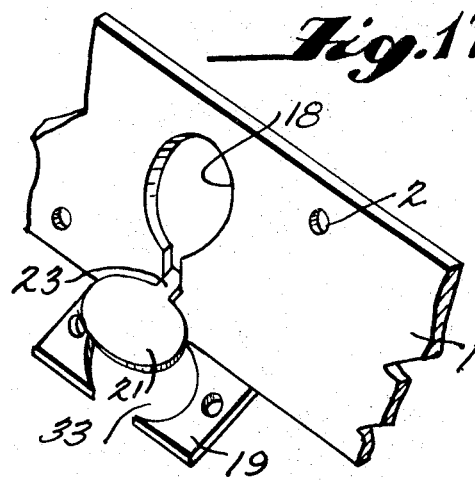

FIG. 17 is a pictorial view of a different portion of the blade-like attachment member shown in FIG. 10 showing the struck-out cap bent back into its final position over the claw enclosed aperture also in its final position.

Figure 18:
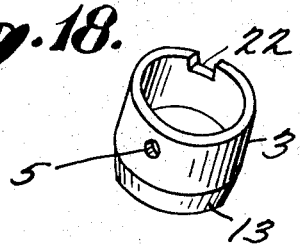
Figure 19:
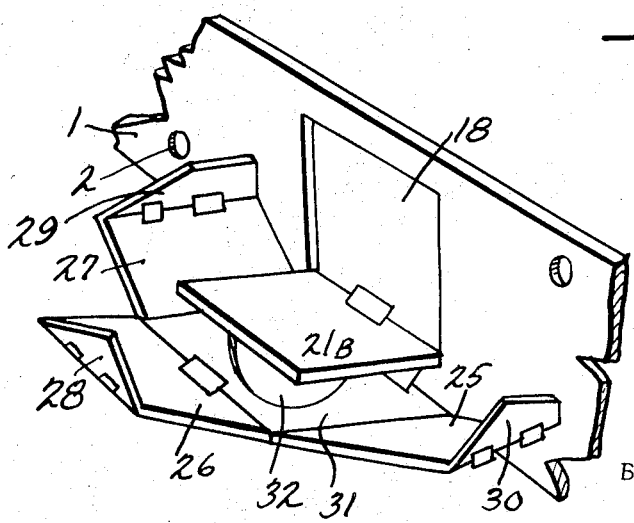

FIG. 18 is a pictorial view of the ball retaining chamber used with the embodiment of the blade-like attachment member shown in FIG. 10 showing that the ball may be inserted at this stage before inserting it into the claws of the blade and lowering the cap inside the top rim of the chamber with the cap retaining neck registering with the notch at the top of the chamber, and showing the clean-out hole.

Referring in detail to the drawings, the ice-hockey stick is of the usual or customary type consisting of a handle and a blade and having a bottom edge which contacts the surface.

My invention, as shown in FIGS. 1–8 in a first embodiment, consists of an article of manufacture comprising a fabrication with a blade-like attachment member 1 with holes 2 for a means of fastening the attachment member to the hockey stick blade and a plurality of chambers of graduated sizes as in those shown 12, 11, 10, 9, 8, which enclose the balls and whose walls 3 and top cover 21 and ball retainer 13 form the frictional members for the nonfriction member or ball 4 and have a means 7 for being fastened to the attachment member 1, a cleanout hole 5 is located anywhere between the arc of the upper half of the ball and the upper wall 3 and top of the chamber 21 and this area is designated 6. The whole fabrication may be made of metal, nylon plastic or other material or of a combination thereof and the balls may also be made of metal, nylon, plastic or other material. The whole fabrication may be inserted into the notched out portion 14 of the hockey stick, as shown in FIG. 8, until the invention blade 1 brings up against the hockey stick blade and a means of fastening carried out.

Hockey stick blades may be made any thickness according to the whim of various manufacturers and 15 depicts the thickness of one blade, the thickness denoted by 16 at the edge, whereas 17 shows a number of possible thicknesses which could cause the chambers to protrude more or to recede into 14 depending on whether the stick blade was thinner or thicker.

In FIG. 15b a V-cut 24 embraces the sides 3 of the V-shaped chamber in one variation of a chamber thus retaining it.

A second embodiment of the blade-like attachment member is shown in FIGS. 11–13 wherein the attachment member 1 has recesses therein allowing the attachment member to be centered over the ball retaining chambers of graduated sizes—12, 11, 10, 9, 8, with the invention blade notched 20 in graduated sizes to receive the chambers 12, 11, 10, 9, 8, which has means of being fastened in position in the blade 1 by welding, slotting, clamping or rivetting.

A third embodiment of the blade-like attachment member is shown in FIG. 10 and would have struck-out parts 18 of round or irregular shapes 21 and 21A and pattern cut appendages below in the shape of claws or clamps 19 designed to clamp onto and into the ball retainer 13 and chamber 3 and a means provided to permanently secure them in place. The stem of part 21 fits into notch 22 of retainer 13.

I claim:

1. In a hockey stick having a handle portion and integral therewith a blade portion and a plurality of spaced recesses in the base portion of said blade, a friction reducing means comprising:
   a blade-like attachment member fixedly attached to a surface of said hockey stick blade,
   a plurality of anti-friction members,
   means attaching said anti-friction members to said blade-like attachment member in a spaced relationship corresponding to the spaced relationship of said recesses in said base portion of said blade,
   means attaching said attachment member to said hockey stick blade so that said anti-friction members register with said recesses,
   said anti-friction members being operable from said recesses to reduce friction forces between said blade and an adjacent surface, the vertical position of said anti-friction members on said attachment member being such that said anti-friction members protrude below the base portion of said blade sufficiently to prevent contact of said blade with said adjacent surface.

2. The friction reducing means for a hockey stick blade defined in claim 1 wherein said anti-friction members are balls.

3. The friction reducing means for a hockey stick defined in claim 2 wherein said means attaching said anti-friction members to said blade-like attachment member are tube shaped with a capped top and are of a size and shape which will allow said balls to rotate therein.

4. The friction reducing means for a hockey stick defined in claim 2 wherein said means attaching said anti-friction members to said blade-like attachment member are square-shaped and define a hole in the bottom thereof to allow said balls to protrude therefrom, said square-shaped attaching means being of a size and shape to allow said balls to rotate therein.

5. The friction reducing means for a hockey stick defined in claim 1 wherein said blade-like attachment member includes means defining recesses in the lower edge thereof and wherein said means attaching said anti-friction members to said blade-like attachment member is centrally disposed in said recesses of said attachment member.

6. The friction-reducing means for a hockey stick defined in claim 1 wherein said means attaching said anti-friction members to said blade-like attachment member comprises appendages extending from the lower edge of the blade-like attachment member and bent at substantially a 90° angle wherein portions of said attachment member are struck therefrom and bent at substantially a 90° angle to form chambers which position said anti-friction members.

7. The frirtion-reducing means for a hockey stick defined in claim 6 wherein said means attaching said anti-friction members to said blade-like attachment member includes notches in the top portions thereof to receive said struck portions of said attachment member.

References Cited

UNITED STATES PATENTS

| | | | |
|---|---|---|---|
| 2,255,332 | 9/1941 | Russell | 273—174 |
| 3,157,401 | 11/1964 | Wallach | 273—128 X |
| 3,206,210 | 9/1965 | Bard | 273—128 |

ANTON O. OECHSLE, Primary Examiner

T. BROWN, Assistant Examiner

U.S. Cl. X.R.

273—174